(12) United States Patent
Kuhn et al.

(10) Patent No.: US 6,471,617 B1
(45) Date of Patent: Oct. 29, 2002

(54) INFINITELY VARIABLE TOROIDAL DRIVE

(75) Inventors: Walter Kuhn, Friedrichshafen (DE); Jürgen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/462,004

(22) PCT Filed: Jul. 20, 1998

(86) PCT No.: PCT/EP98/04495

§ 371 (c)(1),
(2), (4) Date: Dec. 29, 1999

(87) PCT Pub. No.: WO99/05434

PCT Pub. Date: Feb. 4, 1999

(30) Foreign Application Priority Data

Jul. 26, 1997 (DE) .......................................... 197 32 275

(51) Int. Cl.$^7$ .............................................. F16H 15/38
(52) U.S. Cl. ........................................... 476/42; 476/40
(58) Field of Search ............................... 476/40, 42, 41; 74/606 R

(56) References Cited

U.S. PATENT DOCUMENTS

| | | |
|---|---|---|
| 2,152,796 A | 4/1939 | Erban |
| 2,762,232 A | 9/1956 | Bade |
| 3,739,658 A | 6/1973 | Scheiter |
| 4,893,517 A | 1/1990 | Nakano |
| 4,934,206 A | 6/1990 | Nakano |
| 5,033,322 A | 7/1991 | Nakano |
| 5,144,850 A | 9/1992 | Hibi |
| 5,230,258 A | 7/1993 | Nakano |
| 5,391,126 A | 2/1995 | Fukushima et al. |
| 5,538,483 A | * 7/1996 | Kobayashi et al. ........... 476/42 |
| 5,916,057 A | * 6/1999 | Waltz et al. .................. 476/40 |

FOREIGN PATENT DOCUMENTS

| | | |
|---|---|---|
| DE | 44 44 952 A1 | 6/1995 |
| EP | 0 420 157 A2 | 4/1991 |
| JP | 06-341502 A | 12/1994 |
| JP | 08-135747 A * | 5/1996 |

* cited by examiner

Primary Examiner—William C. Joyce
(74) Attorney, Agent, or Firm—Davis & Bujold, P.L.L.C.

(57) ABSTRACT

An infinitely variable toroidal drive comprising a housing (1), an input shaft (3), a torque converter (34), two input discs (5, 15) with toroidal surfaces, two output discs (6, 16) with toroidal surfaces wherein one input disc and one output disc each form a pair and the two output discs are arranged next to each other with mirror symmetry, several friction wheels for transmitting a torque from the input disc to the corresponding output disc, an output shaft (10) and a gearwheel system (8, 9) between output discs and output shaft, there being removably fastened on the transmission housing (1) a holding frame (2) having: an upper portion (28), a lower portion (29), fastening devices (20, 30 and 46, 47) for fastening pivots (42, 43 and 48, 49) and a bearing support member (7) which connects the upper portion (28) with the lower portion (29) and in which is situated at least one bearing (24) for the gear wheel (8).

7 Claims, 3 Drawing Sheets

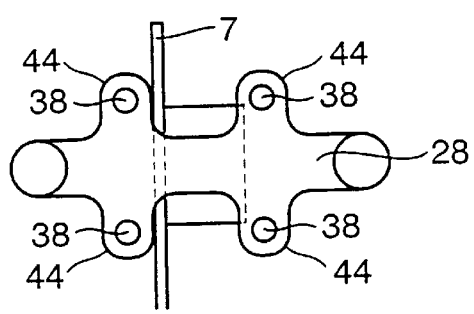
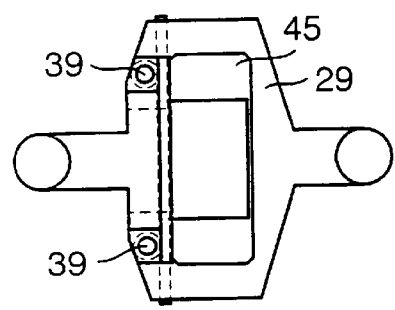
Fig. 3a    Fig. 3b
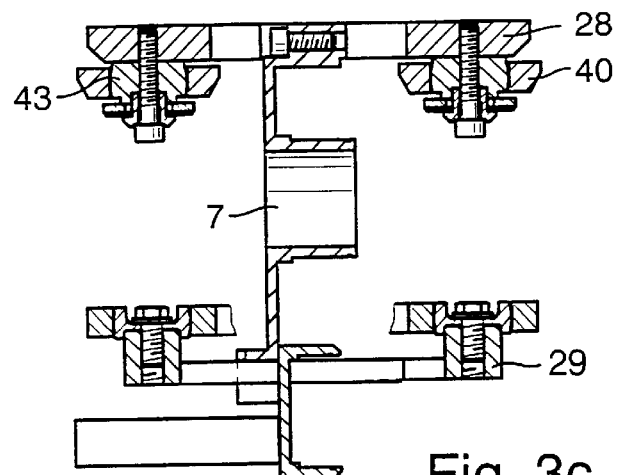
Fig. 3c
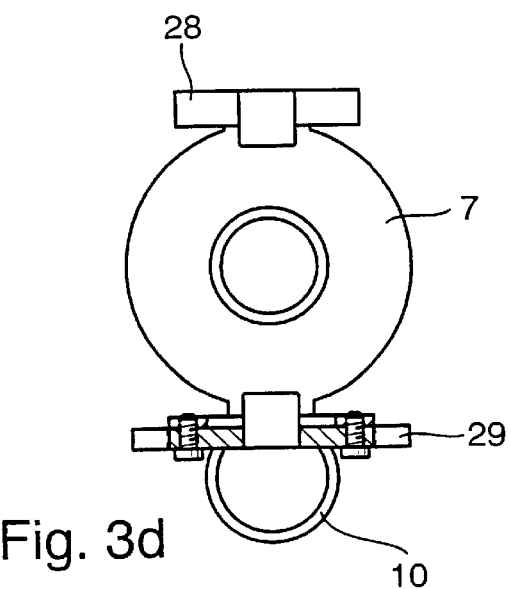
Fig. 3d

INFINITELY VARIABLE TOROIDAL DRIVE

BACKGROUND OF THE INVENTION

The invention concerns an infinitely variable toroidal drive.

Those infinitely variable toroidal drives usually have, co-axially disposed in relation to a common shaft, input and output discs which are arranged in pairs and have toroidal-shaped inner surfaces, friction wheels situated between the pairs of input and output discs. The friction wheels are in frictional contact both with the input discs and with the output discs and transmit the torque that has been transmitted to them by the input disc to the output disc by frictional contact, the rotational speed of the friction wheels being higher as greater is the distance between their contact point with the input disc and the axis of rotation. On the other hand, the rotational speed of the output disc is higher as nearer the contact point is between friction wheel and output disc to the axis of rotation. Accordingly, the rotational speed of the output disc can be infinitely and arbitrarily set by swiveling the friction wheels. To this end, the axes of rotation of the friction wheels are supported on a carrier which can be controlled via a swiveling device.

SUMMARY OF THE INVENTION

The basic principle of such infinitely variable toroidal drives has already been described in U.S. Pat. No. 2,152,796 published in 1939. In this publication two pairs of concave input and output discs are provided between which are disposed swiveling supported friction wheels so that a torque, transmitted via an input shaft to the input discs, and the friction wheels, according to the relative position of the friction wheels with a reduction ratio depending thereon, is fed via the input discs, a gear wheel step and a hollow shaft to a compound gear in the form of a planetary transmission. The web of the planetary transmission drives an output shaft which is connected with the input gears, e.g. of a motor vehicle. At the same time, the output shaft can be disposed parallel to and spaced from the input shaft. The output gear wheel and the two output discs are rotatably supported on a sleeve which, on its ends, is supported in bearing brackets. The arrangement of the bearing brackets between respective input and output shafts presupposes a sufficiently large installation space between the discs.

The transmission according to U.S. Pat. No. 3,739,658 also has a pull-and-push variator with two input and output discs arranged in pairs between which supported friction wheels are tiltingly situated. This construction includes a bearing bracket which is a component part of the housing and is horizontally placed spatially between the two output discs. The power flowing from the output discs is fed to a hollow shaft via a planetary transmission that, in addition, acts as a differential. The hollow shaft is non-rotatably connected with an output gear wheel and is rotatably retained by the ball bearings in the bearing bracket.

The output gear wheel is drivingly connected with a gear wheel which is non-rotatably fastened to the housing of a torque converter. The latter drives the output shaft of the transmission. The arrangement of the torque converter, on the input of the output shaft, causes a relatively large axial distance between input and output shafts of the transmission. Thus, the occasions for use of such transmission are severely limited, since the required installation space is not always available.

U.S. Pat. No. 4,893,517 discloses an Infinitely variable toroidal drive having an input shaft that penetrates a housing. The housing is divided in two hollow spaces, by a partition wall, in each of which an input disc and an output disc opposite each other with friction wheels therebetween are situated, both the input disc and the output disc lie in both hollow spaces on a common axis toward which the friction wheel can be swung to attain the desired speed ratio. The two pairs of input discs and output discs are disposed in mirror symmetry to one another in both hollow spaces so that both output discs are next to each other, specifically at both sides of the partition wall separating the two hollow spaces from each other and in which a gear wheel is supported which is actuated with the output torque jointly by both output discs.

The torque is transmitted, via another gear wheel to a parallel output shaft thereby to penetrate only one of the two hollow spaces and be supported on the partition wall on one end.

The partition wall can be introduced in the housing, together with the appertaining bearings and spacers, and bolted therewith as a pre-assembled unit, however the possibility of preassemblage is limited to a few individual parts. Therefore, the assembly cost for completing the transmission is still considerable. Another disadvantage of this transmission consists in that very strong forces are introduced in the transmission housing, which makes a strong construction with a corresponding heavy weight necessary.

U.S. Pat. No. 5,033,322 also describes an infinitely variable toroidal drive having basically the same design as the above described toroldal, i.e. two transmission units each in the form of an input disc, an output disc and friction wheels pivotably supported therebetween. In order to prevent the carriers of the friction wheels of the other transmission unit from being exposed to vibrations, in such a toroidal drive whenever one transmission unit is controlled by the control device, a mechanical device is provided in this known toroidal drive. The mechanical device prevents reciprocal movement of the first pair of carriers for the friction wheels and the second pair of carriers for the friction wheels. The device consists of upper and lower transverse links (i.e. yokes) which accommodate the bearings for the carriers (pivots) of the friction wheels and which are swingingly disposed around pivots fastened to the housing. In order to eliminate movement relative to one another, the transverse links are rigidly interconnected by rods extending in a longitudinal direction. Vibrations, acting upon the carriers due to the friction wheels, are limited so that the slip on the second transmission unit is reduced.

The problem to be solved by this invention is to provide a toroidal drive in which assemblage is considerably easier so that the production costs are reduced and which has slight weight.

The inventive transmission offers the advantage that the largest part of the forces introduced are absorbed by the frame so that the housing is unburdened. The pre-assemblage of the essential parts on the frame makes easier and accelerates the construction of the toroidal drive, since the frame with the pre-assembled parts, after being introduced in the housing which can be designed considerably lighter than the traditional housing, has to be connected with the latter only on a few places.

BRIEF DESCRIPTION OF THE DRAWINGS

The invention is explained in detail herebelow with reference to the drawing in which is shown an advantageous embodiment of the invention. In the drawing:

FIG. 3 shows a few separate parts of the toroidal drive in top view, bottom view, sectional view and front view.

DESCRIPTION OF THE PREFERRED EMBODIMENTS

Figure 1:
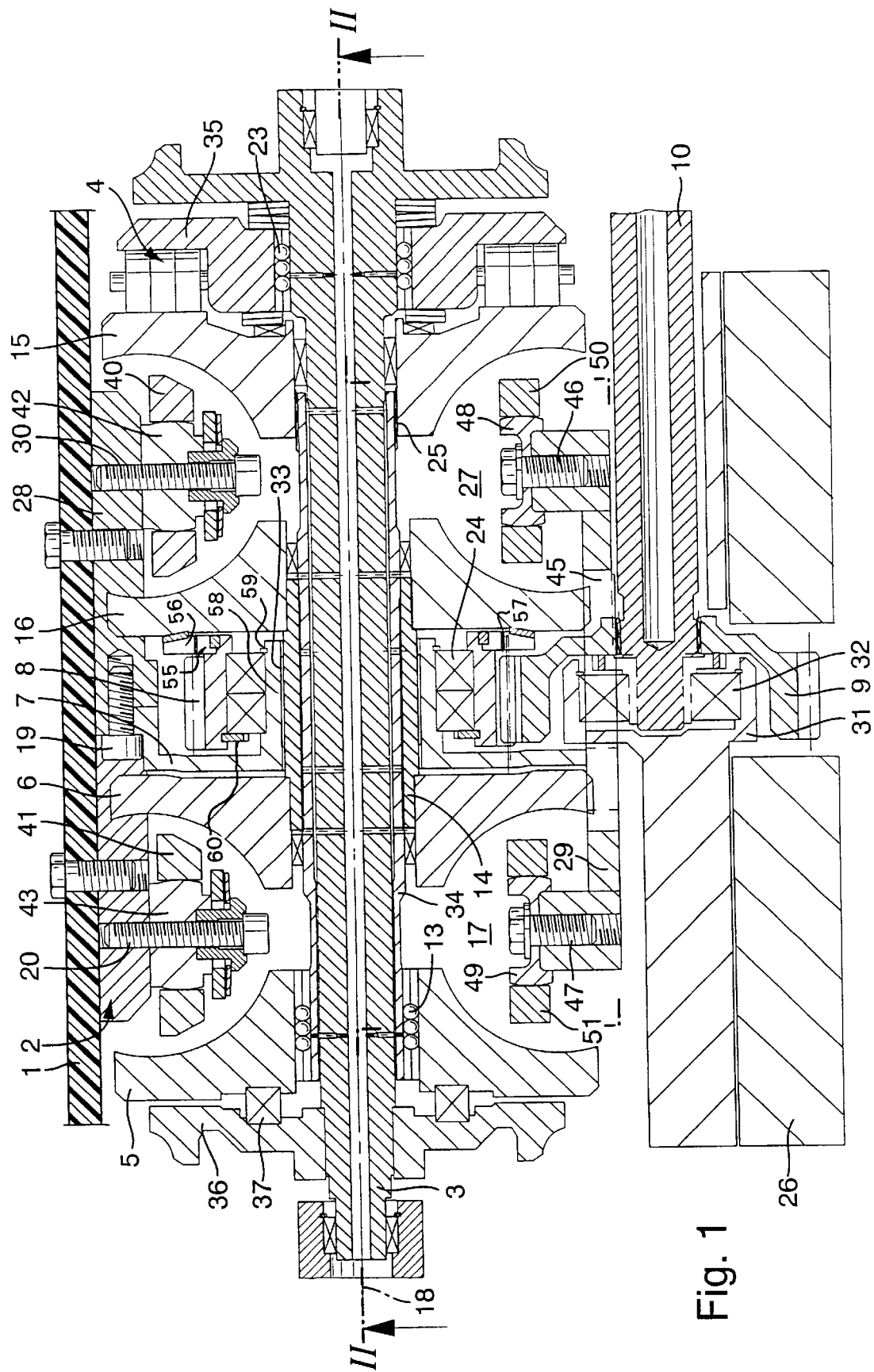
FIG. 1 is a vertical section through the toroidal drive according to the invention.

In the drawings, in which the same parts have been given the same reference numerals, 1 designates the housing of the friction wheel transmission (or toroidal drive), the input shaft 3 of which is connected with a starting element, not shown, such as a torque converter or a wet-operating starting clutch of a prime mover of a motor vehicle. In the housing 1, two transmission units are co-axially disposed in relation to the input shaft 3. One transmission unit has an input disc 5 and an output disc 6 the surfaces of which, facing each other, have toroidal shape; the other transmission unit has an input disc 15 and, situated opposite to it, an output disc 16 the surfaces of which, facing each other, likewise have toroidal shape. In each transmission unit two friction wheels 11, 21 are preferably provided which are fastened on tiltable carriers 12, 22 so that they can be pivoted relative to the longitudinal axis 18 of the input shaft 3. The friction wheels 11, 21 are in frictional contact with the two surfaces that face it of the input discs 5, 15 and of the output discs 6, 16 the friction wheels of one transmission unit being disposed symmetrically relative to the axis of the input shaft 3.

Figure 2:
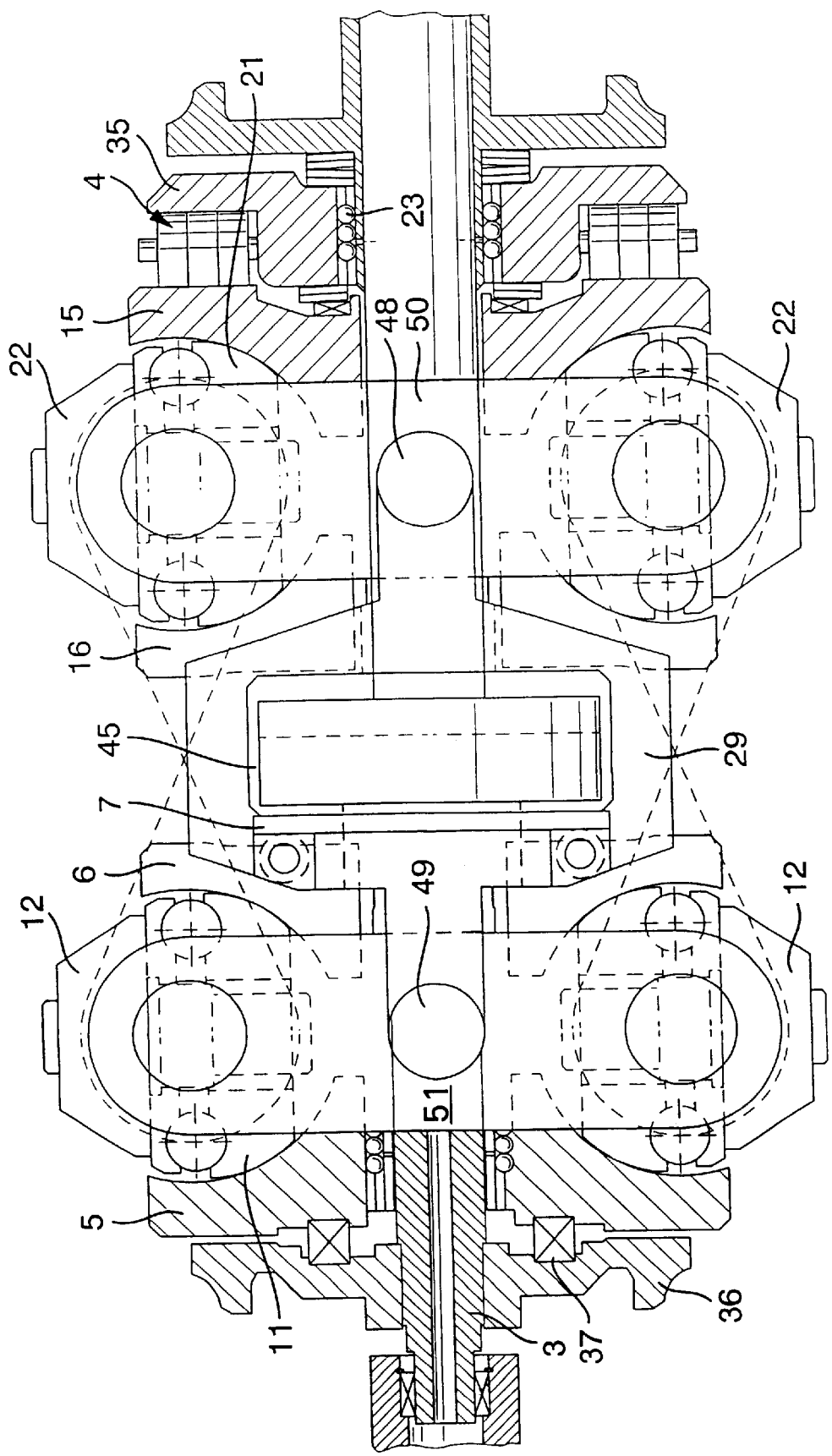
FIG. 2 is a section offset by 90° thereto along the line II—II of FIG. 1

If the friction wheels 11, 21 are now inclined by a pivoting device, not shown, in particular, in relation to the longitudinal axis of the input shaft 3, the contact points of the periphery of the friction wheels 11, 21 move from the position shown in FIG. 2 along the toroidal surfaces, both of the input discs and the output discs, whereby the reduction ratio between an input and an output speed can be continuously, i.e. infinitely set.

All discs 5, 15, 6, 16 are supported on a torque shaft 34 which is slightly moveable in axial direction relative to the housing 1; the input disc 5 of one transmission unit is non-rotatably fastened with the torque shaft at 13, but supported thereon axially slidingly. The input disc 15 of the other transmission unit is also non-rotatably connected with the torque shaft by engaging teeth 25. Both output discs 6, 16 of both transmission units, which are disposed in the transmission with mirror symmetry and next to each other, are fixedly situated on a common bushing 14, the output disc 16 being firmly connected with a gear wheel which rotatably surrounds the torque shaft 34. A torque transmitted by one input disc 5 to the output disc 6 and a torque transmitted by the other input disc 15 to the output disc 16 is in this way transmitted by both output discs non-rotatably connected with the bushing 14 to the gear wheel 8 that meshes with a gear wheel 9 firmly connected with the output shaft 10. The bearing 24 is designated for the gear wheel 8 and the bearing 32 is designated for the output shaft 10.

The non-rotatably connection of the output disc with the output gear wheel 8 is preferably constructed as follows:

On the output gear wheel 8, an inner ring 55 (lying to the right in the drawing) is non-rotatably placed, e.g. by welding. The inner ring has an outer spline on its outer periphery. The outer spline meshes an inner spline of an outer ring 56. The inner and outer splines of the inner ring 55 and outer ring 56 together form engaging splines 57.

The outer ring 56 is non-rotatably connected with the output disc 16, e.g. by welding. In this manner, between the output disc 16 and the output gear wheel 8, a non-rotatably connection exists by which the proportionate powers of the output discs 6, 16 are added up and passed to the output gear wheel 8 and finally to the gear wheel 9 of the output shaft 10.

Instead of the welded connections, insofar as allowed by the installation conditions, it is possible to use screw connections to fasten the inner ring 55 or the outer ring 56.

In an alternative embodiment, it is entirely possible to omit the inner ring 55. Part of the teeth of the output gear wheel 8, which anyway exists, can be used as part of the engagement splines. The inner spline of the outer ring 56 would then be adapted to the teeth the output gear wheel splines.

On one hand, the described non-rotatable connection between the output disc 16 and the output gearwheel 8 allows the transmission of strong torques and, on the other hand, simple assemblage is ensured, since the drag connection by the axial displacement of the output disc 16 in direction of the output gear wheel 8 is almost automatically produced. The drag connection described has, in addition, the advantage that it requires not much space in an axial direction of the transmission.

The bearing 24 for support of the output gear wheel 8 are situated next to each other upon a collar 58 of the cup-shaped bearing support member 7. The inner rings of the bearing 24 remain stationary in relation to the collar 58 while the outer rings of the bearing 24 rotate together with the output gear wheel 8. The bearings disposed next to each other in the axial direction assume an axial length that substantially corresponds to the tooth width of the output gear wheel 8. A special axially short design can be obtained because of the above described arrangement. Each bearing 24 is secured in axial direction by a retainer ring 59 on the collar 58 and retainer ring 60 on the output gear wheel 8. During the assemblage the output gear wheel 8, together with the bearing 24, are slipped, as a pre-assembled unit, upon the collar 58 and secured with the retainer ring 59.

A cylindrical pressure device 4 is provided between the input disc 15 with a curved path and a disc 35 with a curved path and is supported movably in axial direction upon the input shaft by the bearing 23 and non-rotatably connected with the input shaft, actuating with the aid of the pressure device 4 in the input disc 15 in axial direction toward the output disc 16. An axial disc 36 supports itself on the input disc 5, via a bearing 37. The input disc 5 is moved by the input shaft 3 toward the output disc 6 via the axial disc 36.

A cup-shaped bearing support member 7 is axially traversed by the torque shaft 34 and the bushing 14. The bearing support member is placed between the gear wheel 8 and the output disc 6 so as to separate the parts from each other. It is shaped in such a manner that it accommodates the gear wheel 8 firmly connected with the output disc 16. The output gear wheel 9 of the output shaft 10 meshes with the gear wheel 8.

The bushing 14 is supported in the hole of the cup-shaped bearing support member 7 by a needle bearing 33. The bearing support member 7 supports itself on a holding frame 2 situated in the housing 1. It is removably or permanently connected, i.e. screwed or welded, with an upper and a lower frame clamp 28, 29. The holding frame 2 is formed by the bearing support member 7 and the upper and the lower frame clamps 28, 29. The frame clamps carry, via pivots 42, 43, upper transverse yokes 40, 41 and via pivots 48, 49 lower transverse yokes 50, 51 in which are supported the carriers 12, 22 for the friction wheels 11, 21.

On the output side of the gear wheel 8, the support has a vertical bearing inner ring so that the output gear wheel rotates with the outer ring of the support. By virtue of the design of the bearing support member and the arrangement of the bearing 24, an axially relatively short toroidal drive design is possible despite gear wheels 8, 9 which are wider and thus capable of bearing heavy loads.

A fastening device 19, such as a screw construction is between the cup-shaped bearing support member 7 and the holding frame 2. With 20, 30 are designated fastening devices for the pivots 42, 43 of the transverse yokes 40, 41 and with 46, 47 fastening devices for the pivots 48 and 49 of the transverse yokes 50, 51.

FIG. 3A shows the upper frame clamp 28 of the holding frame 2 which essentially has elongated shape and is provided on each of its two sides with two tabs 44 in each of which a threaded opening 38 is provided so that the holding frame 2 can be screwed with the transmission housing.

FIG. 3B shows the lower frame clamp 29 of the holding frame 2, which is essentially configured oval and has a central recess 45 which is partly traversed by the holding part 31 and the output gear wheel 9 and which is provided with threaded openings 39 in order to screw it with the bearing support member 7.

FIG. 3C shows the cup-shaped bearing support member-7 inserted between the upper and lower frame clamps.

FIG. 3D shows a front view between the upper frame clamp 28 and the lower frame clamp 29 of the holding frame with the inserted cup-shaped bearing support member 7. The upper frame clamp 28 and the lower frame clamp 29 of the holding frame 2 are interconnected by the bearing support member 7. The holding frame 2 can now accommodate all essential elements of the inventive toroidal drive which are introduced in the housing as pre-assembled unit.

The output shaft is supported with its bearing 32 in a holding part 31 which is partly sunk in the recess 45 of the lower frame clamp 29. At the same time, the bearing 32 is surrounded by the input gear wheel 9 while the holding part 31 supports itself upon the transmission housing or is fastened in the holding frame 2 or on the hydraulic control 26, as shown. The bearing 32 is removably secured to the holding part 31; when the output shaft 10 rotates, the inner ring or the outer ring of the bearing 32 can remain stationary.

According to the invention during the operation of the toroidal drive, the torque originating, e.g. from the engine of a motor vehicle, is transmitted via the input shaft and the pressure device 4, 35 to the input disc 15 which, in turn, feeds the torque transmitted to it to the output disc 16 via the corresponding friction wheels; besides, the torque of the input disc 15 is transmitted via the engagement gears 25 to the torque shaft 34 and via the corresponding bearing 13 to the input disc 5 which, in turn, actuates the output disc 6 via the corresponding friction wheels. Therefore, both in the first and in the second transmission units the torque is transmitted by the input disc to the output disc, via the friction wheels, situated therebetween which roll in preselected incline planes.

Both output discs 6, 16 jointly actuate the gear wheel 8 which transmits the output power with the desired reduction ratio to the output shaft 10 via the output gear wheel 9.

What is claimed is:
1. An infinitely variable toroidal drive comprising:
   a housing (1), an input shaft (3) and an output shaft (10);
   a torque shaft (34) disposed co-axially with respect to the input shaft (3);
   two input discs (5, 15) defining toroidal surfaces disposed co-axially relative to the input shaft (3);
   two output discs (6, 16) with toroidal surfaces disposed co-axially relative to the input shaft (3) so that a first one of the input discs (5) and a first one of the output discs (6) together form a first pair of input discs and output discs, a second one of the input discs (15) and a second one of the output discs (16) together form a second pair of input discs and output discs and the two output discs are arranged adjacent one another in mirror symmetry;
   a plurality of friction wheels (11, 21) disposed between the toroidal surfaces of the first and second pairs of input discs and output discs;
   a carrier (12, 22) for the plurality of friction wheels (11, 21);
   a pair of upper transverse yokes (40 and 41) and a pair of lower transverse yokes (50 and 51) supporting the carriers (12, 22);
   a pressure device (4) for producing a torque-dependent axial force for loading the input discs by relative movement of the output discs toward one another;
   a gear system (8, 9) comprising an input gear wheel (8) and an output gear wheel (9), the output gear wheel (9) being supported by the output shaft and the input gear wheel (8) is located between the output discs and connected therewith for torque transmission; and
   a stationary cup-shaped bearing support member (7) supporting a bearing (24) to facilitate rotation of the input gear wheel (8) and transmission of torque from the output discs;
   wherein a holding frame (2) is fastened to the transmission housing (1), and the holding frame (2) has an upper portion (28) and a lower portion (29);
   the stationary cup-shaped bearing support member (7) connects the upper portion (28) to the lower portion (29); and
   the upper pair of transverse yokes (40 and 41) is connected to the upper portion (28) via fasteners (20 and 30) and upper pivots (42 and 43) and the lower pair of transverse yokes (50 and 51) is connected to the lower portion (29) via fasteners (46 and 47) and lower pivots (48 and 49).

2. The toroidal drive according to claim 1, wherein the upper pivots (42, 43) are removably connected with the upper portion (28) and the lower pivots (48, 49) are removably connected with the lower portion (29).

3. The toroidal drive according to claim 1, wherein the stationary cup-shaped bearing support member (7) is removably connected with the upper portion (28) and the lower portion (29).

4. The toroidal drive according to claim 1, wherein only the second one of the output disc (16) is connected to the input gear wheel (8) and a portion of the stationary cup-shaped bearing support member (7) is located between the first one of the output disc (6) and the input gear wheel (8).

5. The toroidal drive according to claim 1, wherein the holding frame (2), the two input discs (5, 15), the two output discs (6, 16), the plurality of friction wheels (11, 21), the carriers (12, 22) for the friction wheels (11, 21), the upper and lower pairs of transverse yokes (40, 41 and 50, 51), the stationary cup-shaped bearing support member (7), the input gear wheel (8) and the input shaft (3) form a pre-assembled unit independent of the housing (1).

6. An infinitely variable toroidal drive comprising:

a housing (1), an input shaft (3) and an output shaft (10);

a torque shaft (34) disposed co-axially with respect to the input shaft (3);

two input discs (5, 15) defining toroidal surfaces disposed co-axially relative to the input shaft (3);

two output discs (6, 16) with toroidal surfaces disposed co-axially relative to the input shaft (3) so that a first one of the input discs (5) and a first one of the output discs (6) together form a first pair of input discs and output discs, a second one of the input discs (15) and a second one of the output discs (16) together form a second pair of input discs and output discs and the two output discs are arranged adjacent one another in mirror symmetry;

a plurality of friction wheels (11, 21) disposed between the toroidal surfaces of the first and second pairs of input discs and output discs;

a carrier (12, 22) for the plurality of friction wheels (11, 21);

a pair of upper transverse yokes (40 and 41) and a pair of lower transverse yokes (50 and 51) supporting the carriers (12, 22);

a pressure device (4) for producing a torque-dependent axial force for loading the input discs by relative movement of the output discs toward one another;

a gear system (8, 9) comprising an input gear wheel (8) and an output gearwheel (9), the output gearwheel (9) being supported by the output shaft and the input gear wheel (8) is located between the output discs and connected therewith for torque transmission; and a stationary cup-shaped bearing support member (7) supporting a bearing (24) to facilitate rotation of the input gear wheel (8) and transmission of torque from the output discs;

wherein a holding frame (2) is fastened to the transmission housing (1), and the holding frame (2) has an upper portion (28) and a lower portion (29);

the stationary cup-shaped bearing support member (7) connects the upper portion (28) to the lower portion (29);

the upper pair of transverse yokes (40 and 41) is connected to the upper portion (28) via fasteners (20 and 30) and upper pivots (42 and 43) and the lower pair of transverse yokes (50 and 51) is connected to the lower portion (29) via fasteners (46 and 47) and lower pivots (48 and 49); and the upper portion (28) has an elongated shape and two tabs (44) are provided along each opposed longitudinal side of the upper portion (28), and each tab (44) is substantially semicircularly in shape and extends outwardly and has an opening (38) therein for connection with the housing (1).

7. An infinitely variable toroidal drive comprising:

a housing (1), an input shaft (3) and an output shaft (10);

a torque shaft (34) disposed co-axially with respect to the input shaft (3);

two input discs (5, 15) defining toroidal surfaces disposed co-axially relative to the input shaft (3);

two output discs (6, 16) with toroidal surfaces disposed co-axially relative to the input shaft (3) so that a first one of the input discs (5) and a first one of the output discs (6) together form a first pair of input discs and output discs, a second one of the input discs (15) and a second one of the output discs (16) together form a second pair of input discs and output discs and the two output discs are arranged adjacent one another in mirror symmetry;

a plurality of friction wheels (11, 21) disposed between the toroidal surfaces of the first and second pairs of input discs and output discs;

a carrier (12, 22) for the plurality of friction wheels (11, 21);

a pair of upper transverse yokes (40 and 41) and a pair of lower transverse yokes (50 and 51) supporting the carriers (12, 22);

a pressure device (4) for producing a torque-dependent axial force for loading the input discs by relative movement of the output discs toward one another;

a gear system (8, 9) comprising an input gear wheel (8) and an output gear wheel (9), the output gear wheel (9) being supported by the output shaft and the input gear wheel (8) is located between the output discs and connected therewith for torque transmission; and a stationary cup-shaped bearing support member (7) supporting a bearing (24) to facilitate rotation of the input gear wheel (8) and transmission of torque from the output discs;

wherein a holding frame (2) is fastened to the transmission housing (1), and the holding frame (2) has an upper portion (28) and a lower portion (29);

the stationary cup-shaped bearing support member (7) connects the upper portion (28) to the lower portion (29);

the upper pair of transverse yokes (40 and 41) is connected to the upper portion (28) via fasteners (20 and 30) and upper pivots (42 and 43) and the lower pair of transverse yokes (50 and 51) is connected to the lower portion (29) via fasteners (46 and 47) and lower pivots (48 and 49); and the lower portion (29) has a substantially oval shape with a central recess (45) which accommodates a portion of a holding part (31) and a portion of the output gear wheel (9).

* * * * *